US012803857B2

(12) United States Patent
Korpi et al.

(10) Patent No.: US 12,803,857 B2
(45) Date of Patent: Nov. 17, 2026

(54) MACHINE LEARNING MODEL-BASED RADIO RECEIVER WITH BOTH TIME AND FREQUENCY DOMAIN PROCESSING IN THE MACHINE LEARNING MODEL, AND RELATED METHODS AND COMPUTER PROGRAMS

(71) Applicant: Nokia Solutions and Networks Oy, Espoo (FI)

(72) Inventors: Dani Johannes Korpi, Espoo (FI); Jaakko Pihlajasalo, Tampere (FI); Mikko Valkama, Nokia (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/867,710

(22) PCT Filed: May 31, 2022

(86) PCT No.: PCT/EP2022/064749
§ 371 (c)(1),
(2) Date: Nov. 20, 2024

(87) PCT Pub. No.: WO2023/232228
PCT Pub. Date: Dec. 7, 2023

(65) Prior Publication Data
US 2026/0074941 A1 Mar. 12, 2026

(51) Int. Cl.
*H04B 7/0413* (2017.01)
*H04L 5/00* (2006.01)
*H04L 27/26* (2006.01)

(52) U.S. Cl.
CPC ..... *H04L 27/26526* (2021.01); *H04B 7/0413* (2013.01); *H04L 5/0007* (2013.01)

(58) Field of Classification Search
CPC ............ H04L 27/26526; H04L 5/0007; H04B 7/0413
(Continued)

(56) References Cited

U.S. PATENT DOCUMENTS

2024/0195660 A1* 6/2024 Kons .................. H04L 27/2639

FOREIGN PATENT DOCUMENTS

WO 2021/181002 A1 9/2021
WO 2022/042845 A1 3/2022
(Continued)

OTHER PUBLICATIONS

Honkala et al., "DeepRx: Fully Convolutional Deep Learning Receiver", IEEE Transactions on Wireless Communications, vol. 20, No. 06, Jun. 2021, pp. 3925-3940.
(Continued)

*Primary Examiner* — Dominic D Saltarelli
(74) *Attorney, Agent, or Firm* — Nokia Technologies Oy

(57) ABSTRACT

Radio receiver devices and related methods and computer programs are disclosed. A radio signal comprising information bits is received at a radio receiver device. The radio receiver device deter-mines log-likelihood ratios, LLRs, of the information bits. The determining of the LLRs comprises applying a machine learning (ML) model to a frequency domain representation of the received radio signal. The ML model is executable to process the frequency domain representation of the received radio signal and to output estimates of the LLRs based on results of the processing. The ML model comprises a first frequency domain processing block, an inverse fast Fourier transform (IFFT) block subsequent to the first frequency domain processing block, a time domain processing block subsequent to the IFFT block, and a fast Fourier transform (FFT) block subsequent to the time domain processing block.

20 Claims, 7 Drawing Sheets

(58) Field of Classification Search
USPC ........................................................ 375/260
See application file for complete search history.

(56) References Cited

FOREIGN PATENT DOCUMENTS

| | | | |
|---|---|---|---|
| WO | 2022/073752 | A1 | 4/2022 |
| WO | 2023/274556 | A1 | 1/2023 |

OTHER PUBLICATIONS

Korpi et al., "DeepRx MIMO: Convolutional MIMO Detection with Learned Multiplicative Transformations", IEEE International Conference on Communications (ICC), Jun. 14-23, 2021, 7 pages.

Finnish Application No. 20215313, "Receiver", filed on Mar. 19, 2021, pp. 1-27.

Pihlajasalo et al., "HybridDeepRx: Deep Learning Receiver for High-EVM Signals", IEEE 32nd Annual International Symposium on Personal, Indoor and Mobile Radio Communications (PIMRC), Sep. 13-16, 2021, pp. 622-627.

Kingma et al., "Adam: A Method for Stochastic Optimization", arXiv, Jan. 30, 2017, pp. 1-15.

International Search Report and Written Opinion received for corresponding Patent Cooperation Treaty Application No. PCT/EP2022/064749, dated Jan. 25, 2023, 14 pages.

Wu et al., "Pure Frequency-Domain Deep Neural Network for IoT-Enabled Smart Cameras", IEEE Internet of Things Journal, vol. 09, No. 19, Oct. 2022, pp. 19049-19061.

* cited by examiner

MACHINE LEARNING MODEL-BASED RADIO RECEIVER WITH BOTH TIME AND FREQUENCY DOMAIN PROCESSING IN THE MACHINE LEARNING MODEL, AND RELATED METHODS AND COMPUTER PROGRAMS

RELATED APPLICATION

This application claims benefit of priority from International Patent App. No. PCT/EP2022/064749, filed May 31, 2022, the disclosure of which is hereby incorporated in its entirety by reference herein.

TECHNICAL FIELD

The disclosure relates generally to communications and, more particularly but not exclusively, to a machine learning model-based radio receiver with both time and frequency domain processing in the machine learning model, as well as related methods and computer programs.

BACKGROUND

Implementing digital radio receiver functionality with neural networks is an emerging concept in the field of wireless communications. At least some of such neural networks may allow a fast and efficient implementation of a radio receiver using, e.g., neural network chips and/or artificial intelligence (AI) accelerators. It is also likely that at least under some circumstances machine learning based solutions may result in higher performance, for example, under particular channel conditions, high user equipment (UE) mobility, with sparse reference signal configurations, and/or under heavily impaired waveforms.

At least in some situations, machine learning (ML)-based receiver implementations may allow a digital radio receiver to operate under conditions that are infeasible for conventional receivers. An example includes a scenario in which a received waveform is heavily distorted. If the receiver can still detect the waveform despite the heavy distortion, this allows the transmitter to operate more efficiently, since a transmitter (TX) power amplifier (PA) is more power efficient closer to its saturation point (producing a heavily distorted signal). In practice, out-of-band emission masks usually define a maximum level of nonlinearity in the transmitter, but in higher millimeter wave (mmWave) frequencies emission limits are less stringent. This means that an in-band error vector magnitude (EVM) tolerated by a receiver may be the bottleneck for the PA power efficiency. This may particularly be the case in uplink (UL) direction, but possibly also in downlink (DL) direction in higher frequencies.

However, at least in some situations, there may also be a need for an ML based radio receiver with support for multiple frequency-multiplexed client devices, for example. Furthermore, at least in some situations, there may also be a need for an ML based radio receiver that is capable of detecting nonlinearly distorted signals with high accuracy, without requiring any ML-based processing before a fast Fourier transform (FFT) block that is typically located after an analog-to-digital converter, a synchronization block, a cyclic prefix removal block and/or a serial-to-parallel converter at the beginning of a processing pipeline of a digital radio receiver, thus making the hardware implementation more straightforward.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a radio receiver device comprises at least one processor, and at least one memory including computer program code. The at least one memory and the computer program code are configured to, with the at least one processor, cause the radio receiver device at least to perform receiving a radio signal comprising information bits. The at least one memory and the computer program code are further configured to, with the at least one processor, cause the radio receiver device at least to perform determining log-likelihood ratios (LLRs) of the information bits. The determining of the LLRs comprises applying a machine learning (ML) model to a frequency domain representation of the received radio signal over a transmission time interval (TTI). The ML model is executable to process the frequency domain representation of the received radio signal and to output estimates of the LLRs based on results of the processing. The ML model comprises at least a first frequency domain processing block. The ML model further comprises at least one inverse fast Fourier transform (IFFT) block subsequent to the first frequency domain processing block. The ML model further comprises a time domain processing block subsequent to the IFFT block. The ML model further comprises at least one fast Fourier transform (FFT) block subsequent to the time domain processing block.

In an example embodiment, alternatively or in addition to the above-described example embodiments, the ML model further comprises a second frequency domain processing block subsequent to the FFT block.

In an example embodiment, alternatively or in addition to the above-described example embodiments, one or two of the first frequency domain processing block, the second frequency domain processing block or the time domain processing block are non-trainable.

In an example embodiment, alternatively or in addition to the above-described example embodiments, at least one of the first frequency domain processing block, the second frequency domain processing block or the time domain processing block comprises at least one residual neural network.

In an example embodiment, alternatively or in addition to the above-described example embodiments, the at least one IFFT block is configured to convert the received radio signal under the processing to time domain.

In an example embodiment, alternatively or in addition to the above-described example embodiments, the at least one FFT block is configured to convert the received radio signal under the processing to frequency domain.

In an example embodiment, alternatively or in addition to the above-described example embodiments, the first frequency domain processing block is configured to perform frequency domain based processing on the received radio signal under the processing, the second frequency domain processing block is configured to perform frequency domain based processing on the received radio signal under the processing, and the time domain processing block is configured to perform time domain based processing on the received radio signal under the processing.

In an example embodiment, alternatively or in addition to the above-described example embodiments, the first frequency domain processing block has multiple output channels, the amount of which being divisible by two.

In an example embodiment, alternatively or in addition to the above-described example embodiments, the received radio signal represents a single client device.

In an example embodiment, alternatively or in addition to the above-described example embodiments, the received radio signal represents multiple frequency-multiplexed client devices.

In an example embodiment, alternatively or in addition to the above-described example embodiments, the at least one IFFT block, the time domain processing block, the FFT block and the second frequency domain processing block are executed independently for each of the multiple frequency-multiplexed client devices.

In an example embodiment, alternatively or in addition to the above-described example embodiments, the independent execution is performed by executing the at least one IFFT block, the time domain processing block, the FFT block and the second frequency domain processing block on sub-bands allocated for each of the multiple frequency-multiplexed client devices.

In an example embodiment, alternatively or in addition to the above-described example embodiments, the ML model comprises more than one IFFT blocks and more than one FFT blocks executable for multiple channel pairs inside the ML model.

In an example embodiment, alternatively or in addition to the above-described example embodiments, the at least one memory and the computer program code are further configured to, with the at least one processor, cause the radio receiver device to perform training the ML model by applying a binary cross entropy loss function.

In an example embodiment, alternatively or in addition to the above-described example embodiments, the received radio signal comprises an orthogonal frequency-division multiplexing (OFDM) radio signal.

In an example embodiment, alternatively or in addition to the above-described example embodiments, the radio receiver device comprises a multiple-input and multiple-output (MIMO) capable radio receiver device.

An example embodiment of a radio receiver device comprises means for performing receiving a radio signal comprising information bits. The means are further configured to perform determining log-likelihood ratios (LLRs) of the information bits. The determining of the LLRs comprises applying a machine learning (ML) model to a frequency domain representation of the received radio signal over a transmission time interval (TTI). The ML model is executable to process the frequency domain representation of the received radio signal and to output estimates of the LLRs based on results of the processing. The ML model comprises at least a first frequency domain processing block. The ML model further comprises at least one inverse fast Fourier transform (IFFT) block subsequent to the first frequency domain processing block. The ML model further comprises a time domain processing block subsequent to the IFFT block. The ML model further comprises at least one fast Fourier transform (FFT) block subsequent to the time domain processing block.

In an example embodiment, alternatively or in addition to the above-described example embodiments, the ML model further comprises a second frequency domain processing block subsequent to the FFT block.

In an example embodiment, alternatively or in addition to the above-described example embodiments, one or two of the first frequency domain processing block, the second frequency domain processing block or the time domain processing block are non-trainable.

In an example embodiment, alternatively or in addition to the above-described example embodiments, at least one of the first frequency domain processing block, the second frequency domain processing block or the time domain processing block comprises at least one residual neural network.

In an example embodiment, alternatively or in addition to the above-described example embodiments, the at least one IFFT block is configured to convert the received radio signal under the processing to time domain.

In an example embodiment, alternatively or in addition to the above-described example embodiments, the at least one FFT block is configured to convert the received radio signal under the processing to frequency domain.

In an example embodiment, alternatively or in addition to the above-described example embodiments, the first frequency domain processing block is configured to perform frequency domain based processing on the received radio signal under the processing, the second frequency domain processing block is configured to perform frequency domain based processing on the received radio signal under the processing, and the time domain processing block is configured to perform time domain based processing on the received radio signal under the processing.

In an example embodiment, alternatively or in addition to the above-described example embodiments, the first frequency domain processing block has multiple output channels, the amount of which being divisible by two.

In an example embodiment, alternatively or in addition to the above-described example embodiments, the received radio signal represents a single client device.

In an example embodiment, alternatively or in addition to the above-described example embodiments, the received radio signal represents multiple frequency-multiplexed client devices.

In an example embodiment, alternatively or in addition to the above-described example embodiments, the at least one IFFT block, the time domain processing block, the FFT block and the second frequency domain processing block are executed independently for each of the multiple frequency-multiplexed client devices.

In an example embodiment, alternatively or in addition to the above-described example embodiments, the independent execution is performed by executing the at least one IFFT block, the time domain processing block, the FFT block and the second frequency domain processing block on sub-bands allocated for each of the multiple frequency-multiplexed client devices.

In an example embodiment, alternatively or in addition to the above-described example embodiments, the ML model comprises more than one IFFT blocks and more than one FFT blocks executable for multiple channel pairs inside the ML model.

In an example embodiment, alternatively or in addition to the above-described example embodiments, the means are further configured to perform training the ML model by applying a binary cross entropy loss function.

In an example embodiment, alternatively or in addition to the above-described example embodiments, the received radio signal comprises an orthogonal frequency-division multiplexing (OFDM) radio signal.

In an example embodiment, alternatively or in addition to the above-described example embodiments, the radio receiver device comprises a multiple-input and multiple-output (MIMO) capable radio receiver device.

An example embodiment of a method comprises receiving, at a radio receiver device, a radio signal comprising information bits. The method further comprises determining, by the radio receiver device, log-likelihood ratios, (LLRs) of the information bits. The determining of the LLRs comprises applying a machine learning (ML) model to a frequency domain representation of the received radio signal over a transmission time interval (TTI). The ML model is executable to process the frequency domain representation of the received radio signal and to output estimates of the LLRs based on results of the processing. The ML model comprises at least a first frequency domain processing block. The ML model further comprises at least one inverse fast Fourier transform (IFFT) block subsequent to the first frequency domain processing block. The ML model further comprises a time domain processing block subsequent to the IFFT block. The ML model further comprises at least one fast Fourier transform (FFT) block subsequent to the time domain processing block.

In an example embodiment, alternatively or in addition to the above-described example embodiments, the ML model further comprises a second frequency domain processing block subsequent to the FFT block.

In an example embodiment, alternatively or in addition to the above-described example embodiments, one or two of the first frequency domain processing block, the second frequency domain processing block or the time domain processing block are non-trainable.

In an example embodiment, alternatively or in addition to the above-described example embodiments, at least one of the first frequency domain processing block, the second frequency domain processing block or the time domain processing block comprises at least one residual neural network.

In an example embodiment, alternatively or in addition to the above-described example embodiments, the at least one IFFT block is configured to convert the received radio signal under the processing to time domain.

In an example embodiment, alternatively or in addition to the above-described example embodiments, the at least one FFT block is configured to convert the received radio signal under the processing to frequency domain.

In an example embodiment, alternatively or in addition to the above-described example embodiments, the first frequency domain processing block is configured to perform frequency domain based processing on the received radio signal under the processing, the second frequency domain processing block is configured to perform frequency domain based processing on the received radio signal under the processing, and the time domain processing block is configured to perform time domain based processing on the received radio signal under the processing.

In an example embodiment, alternatively or in addition to the above-described example embodiments, the first frequency domain processing block has multiple output channels, the amount of which being divisible by two.

In an example embodiment, alternatively or in addition to the above-described example embodiments, the received radio signal represents a single client device.

In an example embodiment, alternatively or in addition to the above-described example embodiments, the received radio signal represents multiple frequency-multiplexed client devices.

In an example embodiment, alternatively or in addition to the above-described example embodiments, the at least one IFFT block, the time domain processing block, the FFT block and the second frequency domain processing block are executed independently for each of the multiple frequency-multiplexed client devices.

In an example embodiment, alternatively or in addition to the above-described example embodiments, the independent execution is performed by executing the at least one IFFT block, the time domain processing block, the FFT block and the second frequency domain processing block on sub-bands allocated for each of the multiple frequency-multiplexed client devices.

In an example embodiment, alternatively or in addition to the above-described example embodiments, the ML model comprises more than one IFFT blocks and more than one FFT blocks executable for multiple channel pairs inside the ML model.

In an example embodiment, alternatively or in addition to the above-described example embodiments, the method further comprises training, by the radio receiver device, the ML model by applying a binary cross entropy loss function.

In an example embodiment, alternatively or in addition to the above-described example embodiments, the received radio signal comprises an orthogonal frequency-division multiplexing (OFDM) radio signal.

In an example embodiment, alternatively or in addition to the above-described example embodiments, the radio receiver device comprises a multiple-input and multiple-output (MIMO) capable radio receiver device.

An example embodiment of a computer program comprises instructions for causing a radio receiver device to perform at least the following: receiving a radio signal comprising information bits, and determining log-likelihood ratios (LLRs) of the information bits. The determining of the LLRs comprises applying a machine learning (ML) model to a frequency domain representation of the received radio signal over a transmission time interval (TTI). The ML model is executable to process the frequency domain representation of the received radio signal and to output estimates of the LLRs based on results of the processing. The ML model comprises at least a first frequency domain processing block. The ML model further comprises at least one inverse fast Fourier transform (IFFT) block subsequent to the first frequency domain processing block. The ML model further comprises a time domain processing block subsequent to the IFFT block. The ML model further comprises at least one fast Fourier transform (FFT) block subsequent to the time domain processing block.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
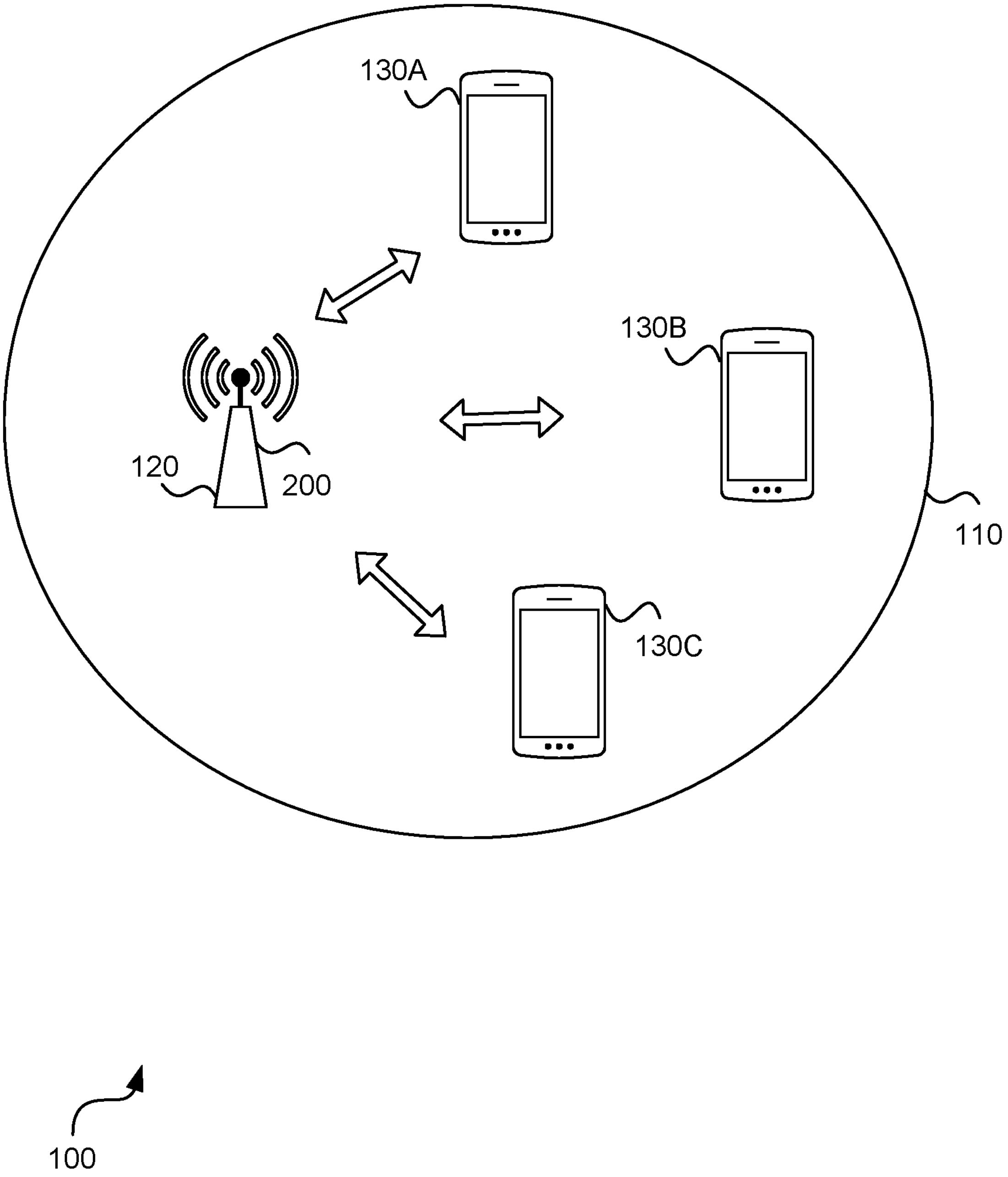
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a radio network 110, such as for instance a fifth generation (5G) new radio (NR) network or a sixth generation (6G) radio network. An example representation of the system 100 is shown depicting client devices 130A, 130B, 130C, and a network node device 120. At least in some embodiments, the network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the network 110 may be configured to serve diverse service types and/or use cases, and it may logically be seen as comprising one or more networks.

The client devices 130A, 130B, 130C may include, e.g., a mobile phone, a smartphone, a tablet computer, a smart watch, or any hand-held, portable and/or wearable device. The client devices 130A, 130B, 130C may also be referred to as a user equipment (UE). The network node device 120 may be a base station. The base station may include, e.g., a fifth-generation base station (gNB) or any such device suitable for providing an air interface for client devices to connect to a wireless network via wireless transmissions. The network node device 120 may comprise a radio receiver device 200 of FIG. 2.

In the following, various example embodiments will be discussed. At least some of these example embodiments may allow a machine learning (ML) model-based radio receiver 200 with both time and frequency domain processing in the ML model 310.

At least some of these example embodiments may allow detecting nonlinearly distorted radio signals with high accuracy without requiring ML processing before a fast Fourier transform (FFT) block 303 located in front of the ML model 310. At least in some embodiments, this may be achieved by introducing inverse fast Fourier transform (IFFT) 314 and FFT 317 transformations inside a frequency-domain ML model 310, allowing the ML model 310 to alternate between time domain processing 316 and frequency domain processing 311, 318. This makes the ML model 310 well-suited for hardware implementation, since all the ML processing is carried out after the FFT block 303 located in front of the ML model 310.

Furthermore, since a received radio signal may be first fed through the FFT 303 in front of the ML model 310, frequency-multiplexed client devices may be separated before time domain processing 316 inside the ML model 310. This may be advantageous since, at least in some embodiments, the effects of nonlinear distortion may be efficiently compensated for only in time domain. This means that, at least in some embodiments, the disclosed ML radio receiver device 200 may support also multiplexed client devices, each with their own nonlinear characteristics. Without this feature, the time-domain waveforms would comprise overlapping client device streams, potentially making it more difficult to process them independently at least in some embodiments.

Furthermore, at least some of these example embodiments may allow repeating the IFFT 314 and FFT blocks 317 inside the ML model 310 for several real-valued channel pairs (the real-valued channel pairs may be combined to complex-valued channels for IFFT/FFT), thereby removing the bottleneck effect possibly resulting from there being just a single IFFT and FFT pair.

Figure 2:
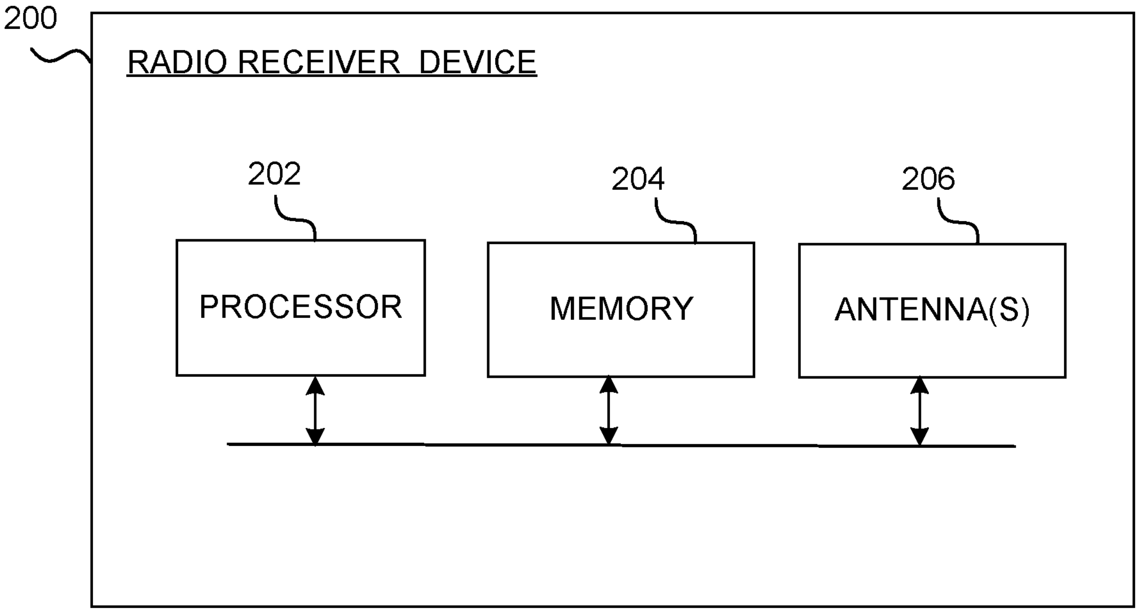
FIG. 2 shows an example embodiment of the subject matter described herein illustrating a radio receiver device.

FIG. 2 is a block diagram of the radio receiver device 200, in accordance with an example embodiment.

The radio receiver device 200 comprises one or more processors 202 and one or more memories 204 that comprise computer program code. The radio receiver device 200 may be configured to receive information from other devices. In one example, the radio receiver device 200 may receive signalling information and data in accordance with at least one cellular communication protocol. The radio receiver device 200 may be configured to provide at least one wireless radio connection, such as for example a 3GPP mobile broadband connection (e.g., 5G). The radio receiver device 200 may comprise, or be configured to be coupled to, at least one antenna 206 to receive radio frequency signals.

Although the radio receiver device 200 is depicted to include only one processor 202, the radio receiver device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments, such as the ML model.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 202 may be configured to execute hardcoded functionality. In an embodiment, the processor 202 is embodied as an executor of software instructions, wherein the instructions may specifically configure the processor 202 to perform the algorithms and/or operations described herein when the instructions are executed.

It is also possible to train one ML model with a specific architecture, then derive another ML model from that using processes such as compilation, pruning, quantization or distillation. The ML model may be executed using any suitable apparatus, for example a CPU, GPU, ASIC, FPGA, compute-in-memory, analog, or digital, or optical apparatus. It is also possible to execute the ML model in an apparatus that combines features from any number of these, for instance digital-optical or analog-digital hybrids. In some examples, weights and required computations in these systems may be programmed to correspond to the ML model. In some examples, the apparatus may be designed and manufactured so as to perform the task defined by the ML model so that the apparatus is configured to perform the task when it is manufactured without the apparatus being programmable as such.

The memory 204 may be embodied as one or more volatile memory devices, one or more non-volatile memory devices, and/or a combination of one or more volatile memory devices and nonvolatile memory devices. For example, the memory 204 may be embodied as semiconductor memories (such as mask ROM, PROM (programmable ROM), EPROM (erasable PROM), flash ROM, RAM (random access memory), etc.).

The radio receiver device 200 may comprise any of various types of digital devices capable of receiving radio communication in a wireless network. At least in some embodiments, the radio receiver device 200 may be comprised in a base station, such as a fifth-generation base station (gNB) or any such device providing an air interface for client devices to connect to the wireless network via wireless transmissions. At least in some embodiments, the radio receiver device 200 may comprise a multiple-input and multiple-output (MIMO) capable radio receiver device.

The at least one memory 204 and the computer program code are configured to, with the at least one processor 202, cause the radio receiver device 200 at least to perform receiving a radio signal 301 comprising information bits. For example, the received radio signal 301 may comprise an orthogonal frequency-division multiplexing (OFDM) radio signal.

The at least one memory 204 and the computer program code are further configured to, with the at least one processor 202, cause the radio receiver device 200 to perform determining log-likelihood ratios (LLRs) of the information bits.

The determining of the LLRs comprises applying an ML model 310, 400, 450 to a frequency domain representation of the received radio signal 301 over a transmission time interval (TTI). The ML model 310, 400, 450 is executable to process the frequency domain representation of the received radio signal 301 and to output estimates 320 of the LLRs based on results of the processing.

The ML model 310, 400, 450 comprises at least a first frequency domain processing block 311, 404, 454. For example, the first frequency domain processing block 311, 404, 454 may be configured to perform frequency domain-based processing on the received radio signal under the processing.

The ML model 310, 400, 450 further comprises at least one IFFT block 314, 406, 457 subsequent to the first frequency domain processing block 311, 404, 454. For example, the at least one IFFT block 314, 406, 457 may be configured to convert the received radio signal under the processing to time domain.

The ML model 310, 400, 450 further comprises a time domain processing block 316, 408, 459 subsequent to the IFFT block 314, 406, 457. For example, the time domain processing block 316, 408, 459 may be configured to perform time domain-based processing on the received radio signal under the processing.

The ML model 310, 400, 450 further comprises at least one FFT block 317, 410, 461 subsequent to the time domain processing block 316, 408, 459. For example, the at least one FFT block 317, 410, 461 may be configured to convert the received radio signal under the processing to frequency domain.

At least in some embodiments, the ML model 310, 400, 450 may further comprise a second frequency domain processing block 318, 412, 463 subsequent to the FFT block 317, 410, 461. For example, the second frequency domain processing block 318, 412, 463 may be configured to perform frequency domain-based processing on the received radio signal under the processing.

At least in some embodiments, one or two of the first frequency domain processing block 311, 404, 454, the second frequency domain processing block 318, 412, 463 or the time domain processing block 316, 408, 459 may be non-trainable, i.e., not neural network-based.

At least in some embodiments, the first frequency domain processing block 311, 404, 454, the second frequency domain processing block 318, 412, 463 and/or the time domain processing block 316, 408, 459 may comprise at least one residual neural network, e.g., at least one deep residual learning block. For example, each deep residual learning block may comprise at least two convolutional layers.

Figure 3:
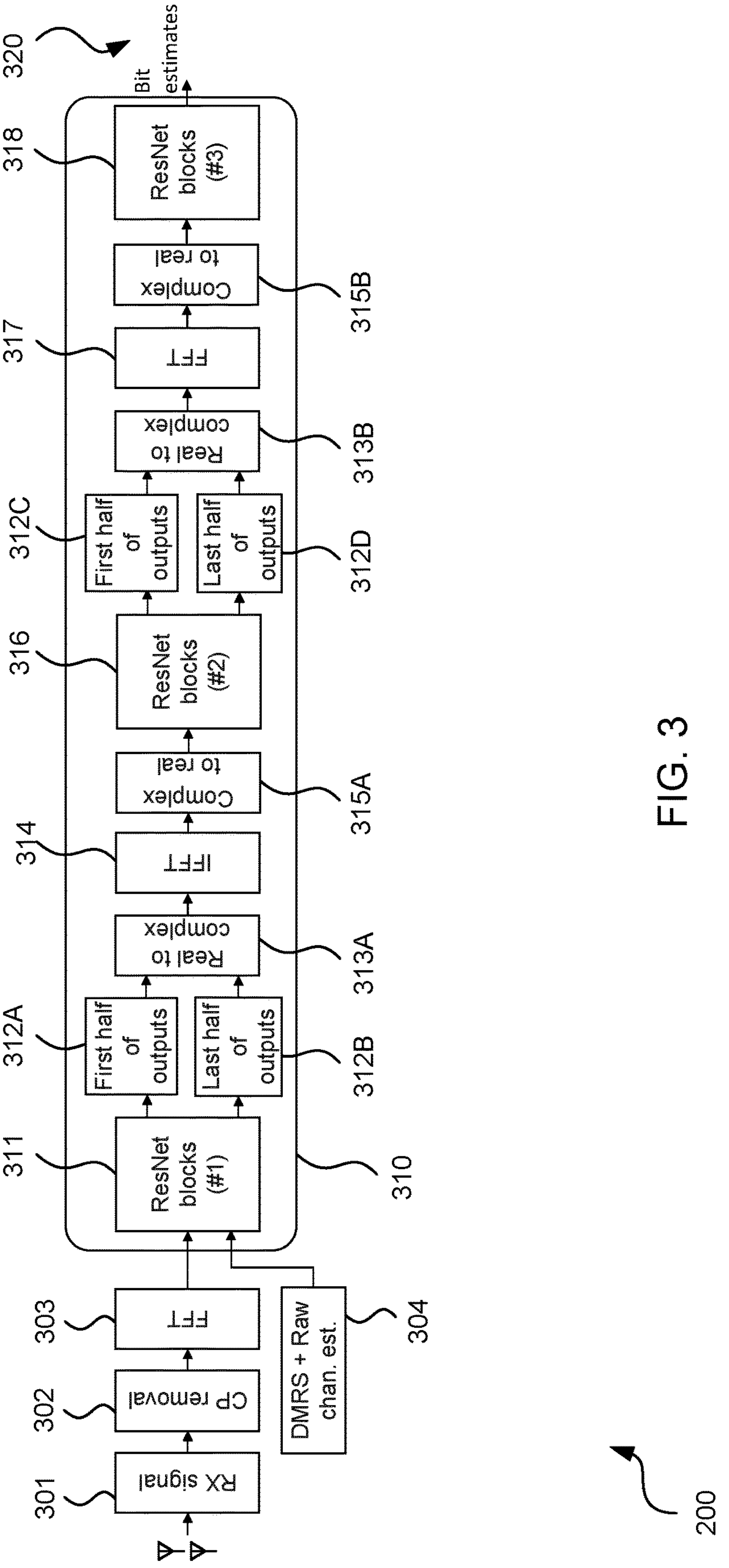
FIG. 3 shows an example embodiment of the subject matter described herein illustrating an example implementation of a radio receiver device.

FIG. 3 shows an example embodiment of the subject matter described herein illustrating an example implementation of the radio receiver device 200. More specifically, FIG. 3 illustrates an example high-level architecture of the radio receiver device 200. Input to the radio receiver device 200 may include the received signal 301 fed through a cyclic prefix removal block 302 and an FFT block 303. The input may further include a raw channel estimate 304 calculated, e.g., by using demodulation reference signals (DMRSs), also referred to as pilots. The radio receiver device 200 may include the ML model 310, the output of which may include the (bit) estimates 320 of the LLRs. The ML model 310 may include, e.g., residual neural network (ResNet) blocks 311, 316, 318. Blocks 312A-312D visualize the splitting of outputs from the ResNet blocks 311, 316 to two parts. The ML model 310 may further include, e.g., real-value to complex-value converters 313A, 313B. The ML model 310 may further include, e.g., the IFFT block 314. The ML model 310 may further include, e.g., complex-value to real-value converters 315A, 315B. The ML model 310 may further include, e.g., the FFT block 317.

Figure 4A:
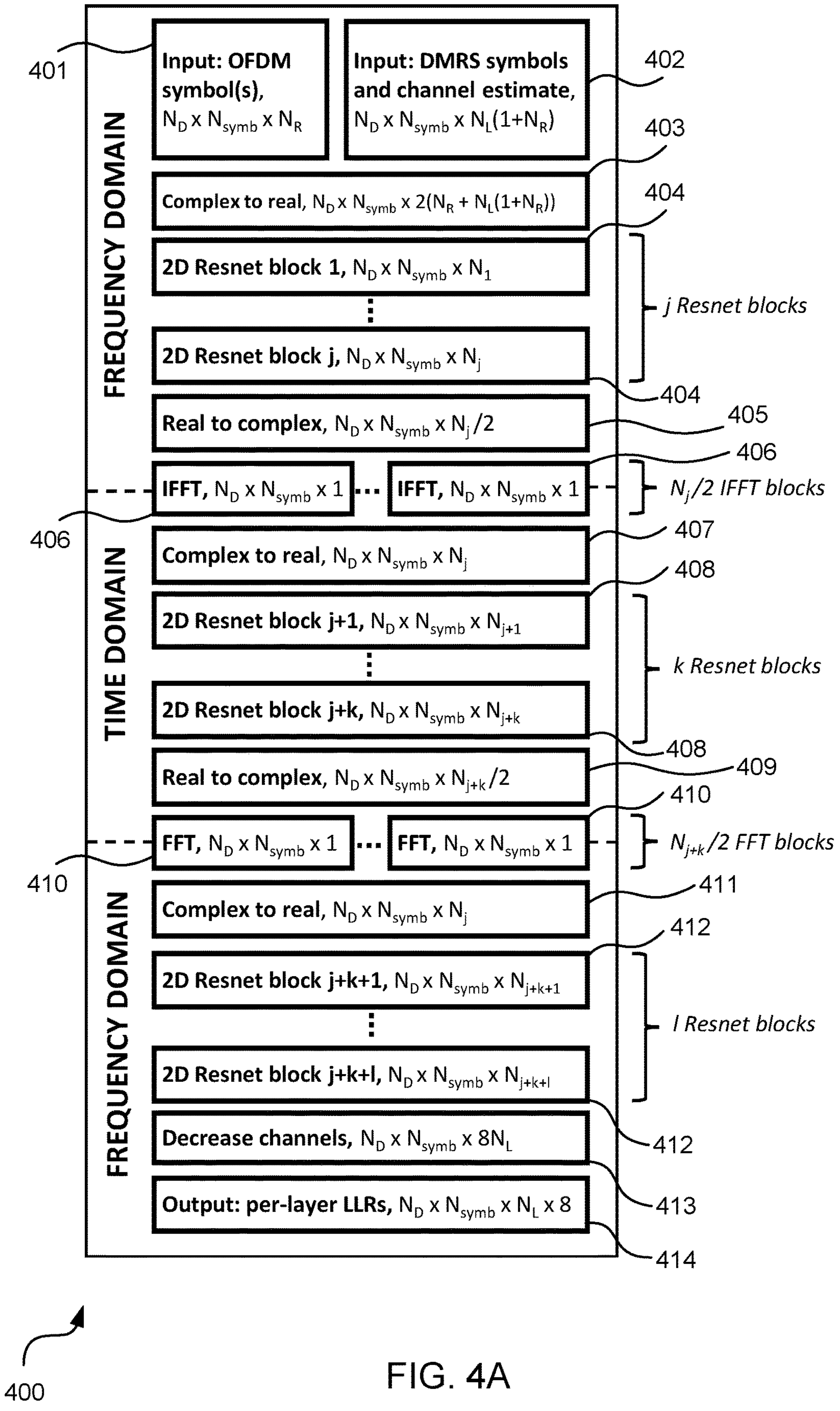
FIG. 4A shows an example embodiment of the subject matter described herein illustrating an example implementation of a machine learning model utilized in a radio receiver device.

At least in some embodiments, the received radio signal may represent a single client device 130A. FIG. 4A shows an example embodiment of the subject matter described herein illustrating an example implementation of an ML model 400 utilized in the radio receiver device 200, suitable for a case in which the single client device 130A is allocated or scheduled over the whole bandwidth. The dimensions within each block may correspond to its output while blocks 404, 408, 412, 413 represent learned parts of the architecture of the ML model 400. $N_D$ denotes the number of used subcarriers, $N_{symb}$ denotes the number of OFDM symbols (typically 14), $N_R$ denotes the number of receiver (RX) antenna streams (may also be streams from, e.g., an analog beam former), and $N_L$ denotes the number of spatially multiplexed MIMO layers. Moreover, $N_1 \ldots N_{j+k+1}$ denote the numbers of output channels in convolutional layers inside the individual ResNet blocks 404, 408, 412.

In the example of FIG. 4A, frequency-domain OFDM symbols 401 may be fed to a residual network (ResNet) type convolutional neural network (CNN), whose input may be one TTI, which typically may comprise fourteen OFDM symbols. Input may further include DMRS symbols and channel estimate 402. Altogether, in the example of FIG. 4A, the ML receiver 200 may be fed a real-valued $N_D \times N_{symb} \times 2(N_R+N_L(1+N_R))$ array, in which the last dimension represents the number of input channels, comprising the received signal, DMRS pilots for each MIMO layer, and the raw channel estimate for each layer (the total number of layers being denoted by $N_L$). A MIMO channel matrix may be vectorized along the channel dimension, hence the $N_L N_R$ raw channel estimates per resource element. This array may be processed with one or more ResNet blocks 404, 408, 412 (the number is denoted by j in this example implementation).

Similar to the ML model 310 of FIG. 3, the ML model 400 may further include complex-value to real-value converters 403, 407, 411, and real-value to complex-value converters 405, 409. Furthermore, the ML model 400 may include a decrease channels block 413 for setting the number of ML model outputs to a desired value. The decrease channels block 413 may be a two-dimensional (2D) convolutional layer, whose number of output channels may correspond to the number of output LLRs per resource element.

At least in some embodiments, the first frequency domain processing block 311, 404, 454 may have multiple output channels, the amount of which being divisible by two. For example, continuing the example of FIG. 4A, the final ResNet block 404 before the IFFT 406 may have $N_j$ output channels, where $N_j$ is divisible by 2.

Then, the real-valued channels may be converted in block 405 into $N_j/2$ complex-valued channels, each of which is fed through an IFFT block 406. Setting $N_j/2>N_R$ may ensure that more information flows through the IFFT transformation 406 than in a case with the restriction $N_j=2N_R$, corresponding to the physical interpretation of the receiver processing. In the example embodiment of FIG. 4A, there may be no need to split the array in frequency domain as it assumes a single client device, and hence the complete resource grid may be fed to the IFFTs 406.

After the IFFT transformations 406, the signal may again be converted to the real value domain in block 407, and fed through k additional ResNet blocks 408. These ResNet blocks 408 may be interpreted to operate on a pseudo time domain signal, thanks to the IFFT 406. This may allow for compensation for the nonlinear distortion in a more efficient manner, at least in some embodiments.

Denoting the number of output channels of the final time-domain ResNet block 408 by $N_{j+k}$, they may again be converted to the complex value domain in block 409 ($N_{j+k}$ may be divisible by 2). The resulting $N_{j+k}/2$ streams may then be fed through FFTs 410 to obtain an equal amount of frequency-domain streams. Similar to the IFFT 406, this may ensure that no bottleneck is formed, at least in some embodiments.

After the FFTs 410, the signals may be converted back to the real value domain in block 411, and they may be fed to the final ResNet blocks 412 in frequency domain. At the output of these ResNet blocks 412, the final log-likelihood ratio (LLR) estimates may be obtained, block 414. At least in some embodiments, the model 400 may output eight LLRs per resource element (RE), to support modulation orders up to 256-QAM (QAM stands for quadrature amplitude modulation). If a lower modulation order is used, the unused LLR outputs may simply be discarded.

At least in some embodiments, the received radio signal may represent multiple frequency-multiplexed client devices 130A, 130B, 130C. In these embodiments, the at least one IFFT block 314, 406, 457, the time domain processing block 316, 408, 459, the FFT block 317, 410, 461 and the second frequency domain processing block 318, 412, 463 may be executed independently for each of the multiple frequency-multiplexed client devices 130A, 130B, 130C. For example, the independent execution may be performed by executing the at least one IFFT block 314, 406, 457, the time domain processing block 316, 408, 459, the FFT block 317, 410, 461 and the second frequency domain processing block 318, 412, 463 on sub-bands allocated for each of the multiple frequency-multiplexed client devices 130A, 130B, 130C.

Figure 4B:
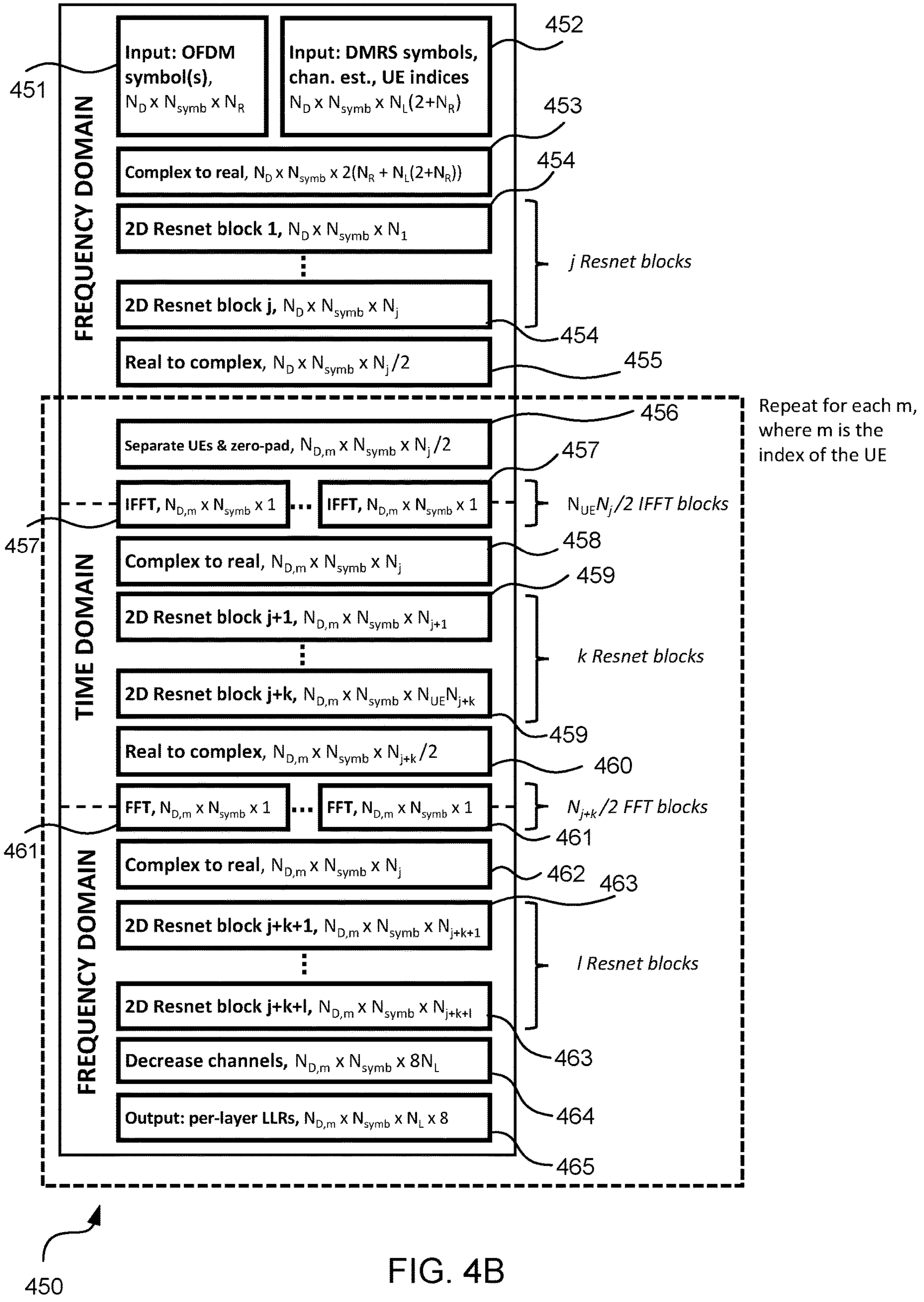
FIG. 4B shows an example embodiment of the subject matter described herein illustrating another example implementation of a machine learning model utilized in a radio receiver device.

FIG. 4B shows an example embodiment of the subject matter described herein illustrating another example implementation of a machine learning model 450 utilized in the radio receiver device 200, suitable for a case with multiple frequency-multiplexed client devices 130A, 130B, 130C. Again, the dimensions within each block may correspond to its output while blocks 454, 459, 463, 464 represent learned parts of the architecture of the machine learning model 450. Notation is similar to that of FIG. 4A, with the addition of $N_{D,m}$ which denotes the effective IFFT size for the $m^{th}$ client device.

In other words, FIG. 4B represents an embodiment which supports frequency-multiplexed client devices 130A, 130B, 130C, each exhibiting independent nonlinear behavior. The radio receiver device 200 may also be provided indices of the scheduled client devices for each RE and layer as an additional input, in order to take that into consideration while processing the RX signal, at block 452. Hence, the input may now be a real-valued $N_D \times N_{symb} \times 2(N_R+N_L(2+N_R))$ array. After the initial frequency-domain processing 451-455 (including input 451 of frequency-domain OFDM symbols, input 452 of DMRS symbols and channel estimate, a complex-value to real-value converter 453, first frequency domain ResNet blocks 454, and a real-value to complex-value converter 455), the client devices 130A, 130B, 130C may be separated and the rest of the processing 456-465 may be carried out independently for each client device. This means that the IFFT 457, time-domain ResNets 459, FFT 461, and the final frequency-domain ResNets 463 may be executed on subbands allocated for individual client devices. The effective IFFT size of the $m^{th}$ client device is denoted by $N_{D,m}$. In a case of no zero-padding, $$\sum_{m=1}^{N_{UE}} N_{D,m} = N_D,$$

where $N_{UE}$ is the total number of client devices. However, it may be beneficial for the forthcoming ML processing to zero-pad (block 456) the IFFT input signals of the different client devices 130A, 130B, 130C to utilize the same IFFT size. This may ensure similar physical interpretation of each IFFT output sample for all client devices. $N_L$ may now be interpreted as the maximum number of supported MIMO layers.

The ML model 450 may further include complex-value to real-value converters 458, 462, and real-value to complex-value converter 460. Furthermore, the ML model 450 may include a decrease channels block 464 for setting the number of ML model outputs to a desired value. The decrease channels block 464 may be a 2D convolutional layer, whose number of output channels may correspond to the number of output LLRs per resource element.

Similar to the ML model 400 of FIG. 4A, in the ML model 450 after the FFTs 461, the signals may be converted back to the real value domain in block 462, and they may be fed to the final ResNet blocks 463 in frequency domain. At the output of these ResNet blocks 463, the final log-likelihood ratio (LLR) estimates may be obtained, block 465.

At least in some embodiments, the frequency-multiplexed client devices 130A, 130B, 130C may be separated and then stacked along the channel dimension, which may facilitate the joint detection of the different client device signals.

At least in some embodiments, the ML model 310, 400, 450 may comprise more than one IFFT blocks 314, 406, 457 and more than one FFT blocks 317, 410, 461 executable for multiple channel pairs inside the ML model 310, 400, 450.

At least in some embodiments, the at least one memory 204 and the computer program code may be further configured to, with the at least one processor 202, cause the radio receiver device 200 to perform training the ML model 310, 400, 450 by applying a binary cross entropy loss function.

Figure 6:
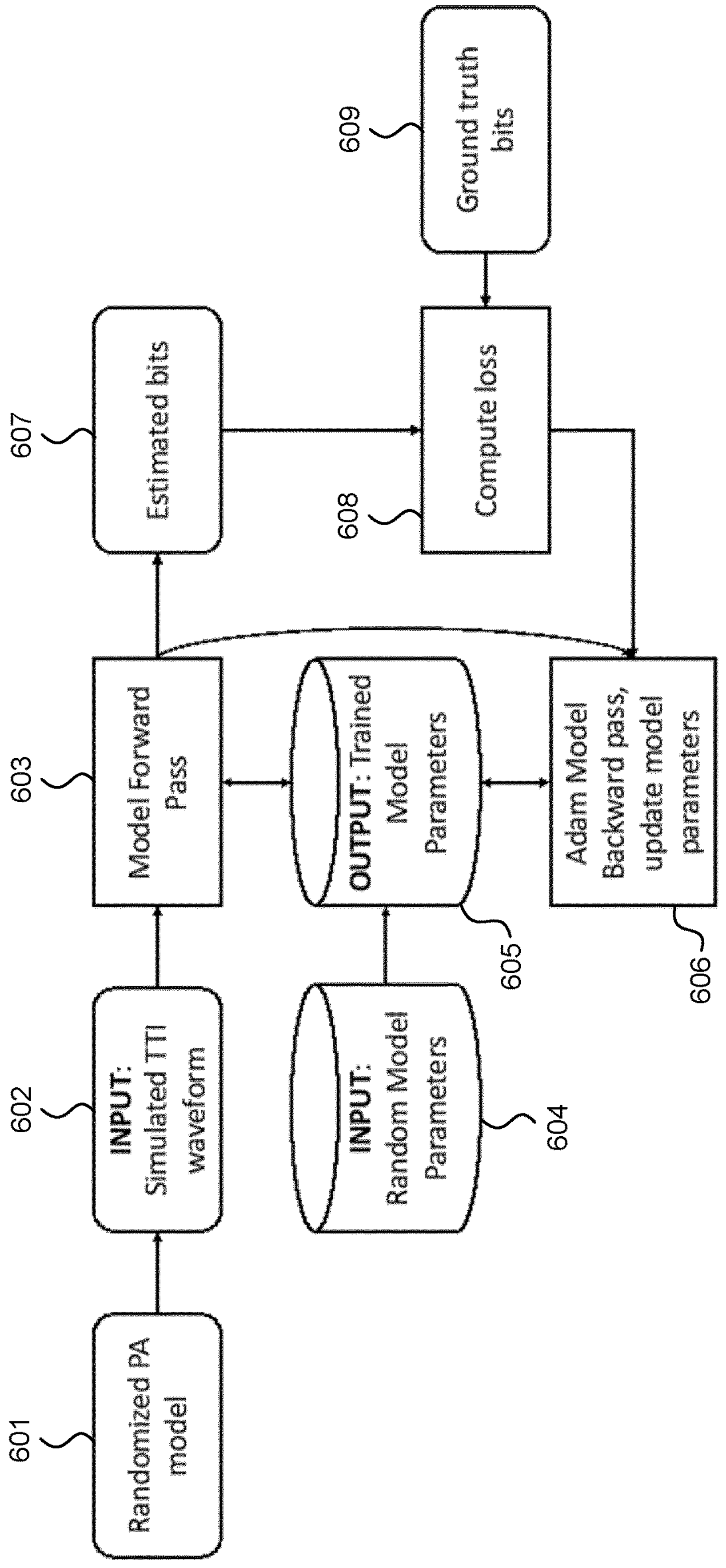
FIG. 6 shows an example embodiment of the subject matter described herein illustrating training of a machine learning model applied by a radio receiver device.

Diagram 600 of FIG. 6 shows an example embodiment of the subject matter described herein illustrating the training of the machine learning model 310, 400, 450 applied by the radio receiver device 200. Input to the NN includes simulated TTI waveforms 602 in frequency-domain, and responses include ground truth bits 609 corresponding to the TTIs. The PA models 601 for the input generation may be randomized to account for varying responses of real-life PAs.

The binary cross entropy may be obtained, e.g., as follows:

$$CE_q(\theta) = -\frac{1}{W_q}\sum_{i=0}^{W_q-1}\left(b_{iq}\log\left(\hat{b}_{iq}\right) + (1-b_{iq})\log\left(1-\hat{b}_{iq}\right)\right)$$

in which q denotes a sample index within a batch, $b_{iq}$ denotes a transmitted bit, $\hat{b}_{iq}$ denotes a bit estimated (block 607) by the radio receiver device 200, and $W_q$ denotes the total number of transmitted bits within a TTI. Moreover, θ denotes the set of all trainable parameters, comprising the ML model weights.

The training may be carried out with, e.g., the following steps:

1. (block 604) initialize trainable weights of the radio receiver device 200. This may be done, e.g., with random initialization. Collect all the trainable weights into a vector θ (block 605).
2. (block 602) obtain a batch of training data, comprising the frequency-domain RX signal with a random PA response, random channel conditions, a random transmit message, etc. The choice of batch size may be done, e.g., based on available memory or observed training performance.
3. (block 603) feed the batch of data through the radio receiver device 200. This is referred to as model forward pass.
4. (block 608) calculate the cross entropy loss for the batch, as discussed above.
5. (block 606) calculate a gradient of the loss with respect to the trainable network parameters θ (this is a so-called backward pass) and update the parameters 605 with a stochastic gradient descent (SGD) rule, using a predefined learning rate. In this example embodiment, a so-called Adam optimizer may be used, which is an SGD variant for neural networks.
6. if a predefined stop condition is met, terminate the training. Otherwise go back to step 2. The stop condition may typically include a predefined amount of iterations, but it may also include a loss value or another performance criterion.

At least in some embodiments, the received information bits may comprise low-density parity-check (LDPC) encoded information bits. The at least one memory 204 and the computer program code may be further configured to, with the at least one processor 202, cause the radio receiver device 200 to perform providing the determined LLRs to LDPC decoding. The LDPC decoding may process the LLRs to determine the information bits contained in the received radio signal.

Figure 5:
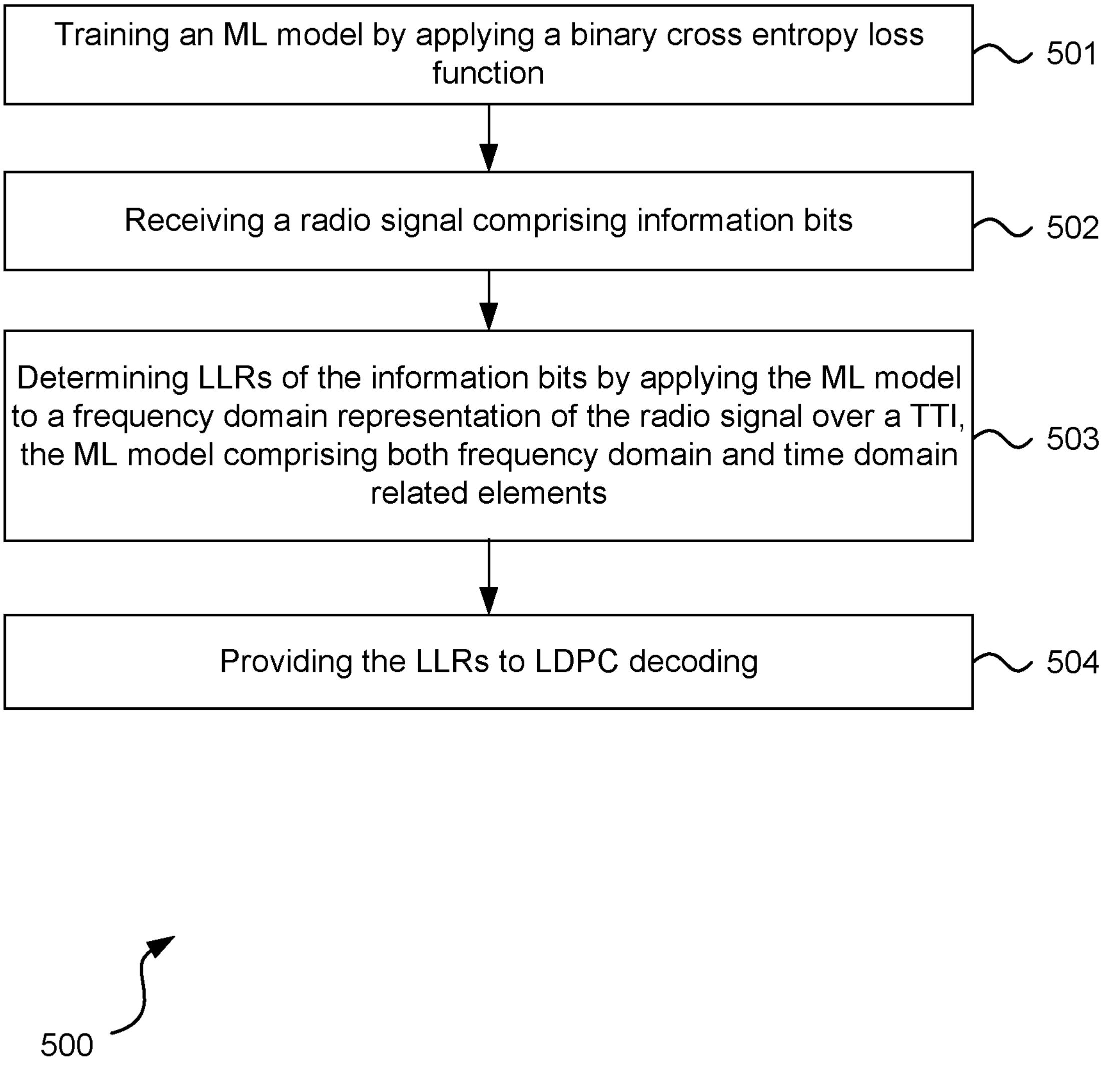
FIG. 5 shows an example embodiment of the subject matter described herein illustrating a method.

FIG. 5 illustrates an example flow chart of a method 500, in accordance with an example embodiment.

At optional operation 501, the radio receiver device 200 may train the ML model 310, 400, 450 by applying a binary cross entropy loss function, as described above in more detail.

At operation 502, the radio receiver device 200 receives a radio signal 301 comprising information bits.

At operation 503, the radio receiver device 200 determines LLRs of the information bits. As described in more detail above, the determining of the LLRs comprises applying a machine learning ML model 310, 400, 450 to a frequency domain representation of the received radio signal 301 over a TTI. The ML model 310, 400, 450 is executable to process the frequency domain representation of the received radio signal 301 and to output estimates 320 of the LLRs based on results of the processing. The ML model 310, 400, 450 comprises at least a first frequency domain processing block 311, 404, 454; and at least one IFFT block 314, 406, 457 subsequent to the first frequency domain processing block 311, 404, 454; and a time domain processing block 316, 408, 459 subsequent to the IFFT block 314, 406, 457; and at least one FFT block 317, 410, 461 subsequent to the time domain processing block 316, 408, 459.

At optional operation 504, the radio receiver device 200 may provide the determined LLRs to LDPC decoding.

The method 500 may be performed by the radio receiver device 200 of FIG. 2. The operations 501-504 can, for example, be performed by the at least one processor 202 and the at least one memory 204. Further features of the method 500 directly result from the functionalities and parameters of the radio receiver device 200, and thus are not repeated here. The method 500 can be performed by computer program(s).

At least some of the embodiments described herein may allow IFFT and FFT conversion pairs inside the ML model (e.g., a deep convolutional ResNet). This means that the ML model may carry out consecutive phases of frequency-domain, time-domain, and frequency-domain processing.

At least some of the embodiments described herein may allow adding several IFFT and FFT blocks, such that they are executed for several channel pairs inside the ML model (each channel pair being mapped to real and imaginary parts of the complex-valued IFFT/FFT input signals). This means that there is no bottleneck upon IFFT or FFT conversion (as there would be if, e.g., only one complex-valued signal would be passed through).

Thanks to the IFFT-FFT pairs inside the ML model, the disclosed radio receiver device 200 may detect and compensate for nonlinearly distorted signals operating fully on post-FFT samples, which makes its hardware implementation much more straightforward (as the effects of nonlinear distortion can be efficiently compensated for only with time-domain convolutional processing).

Due to the initial frequency-domain processing within the ML model, frequency-multiplexed client devices may be separated before the IFFT conversion and consequent time-domain processing. This means that the radio receiver device 200 may compensate for the nonlinear distortion of the different client devices separately.

At least some of the embodiments described herein may allow reducing the size of the ML model due to it utilizing multiple IFFT and FFT blocks, resulting in lower computational complexity of the ML processing part.

At least some of the embodiments described herein may allow introducing an IFFT inside the frequency-domain ML model, which means that the radio receiver device 200 may access a pseudo time domain waveform. This may allow it to more accurately detect a nonlinearly distorted waveform, since nonlinear distortion may lend itself to convolutional processing better in the time domain. Performing another FFT before the final part of the radio receiver device 200 may allow the last part of the ML processing to be carried out in the frequency domain for more convenient bit estimation.

At least some of the embodiments described herein may allow facilitating the separation of frequency-multiplexed client devices before the IFFT. This means that the convolutional ResNet may be carried out independently for each client device, allowing for detecting their signals despite different nonlinearity levels.

At least some of the embodiments described herein may allow repeating the IFFT and FFT transformations for several channel pairs, instead of restricting the transformations for physical complex valued signals. This may ensure that no bottleneck is formed at any point of the model.

The radio receiver device 200 may comprise means for performing at least one method described herein. In one example, the means may comprise the at least one processor 202, and the at least one memory 204 including program code configured to, when executed by the at least one processor, cause the radio receiver device 200 to perform the method.

The functionality described herein can be performed, at least in part, by one or more computer program product components such as software components. According to an embodiment, the radio receiver device 200 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAS), Program-specific Integrated Circuits (ASICs), Program-specific Standard Products (ASSPs), System-on-a-chip systems (SOCs), Complex Programmable Logic Devices (CPLDs), and Graphics Processing Units (GPUS).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A radio receiver device, comprising:

at least one processor; and at least one memory including computer program code;

the at least one memory and the computer program code configured to, with the at least one processor, cause the radio receiver device at least to perform:

receiving a radio signal comprising information bits; and determining log-likelihood ratios, LLRs, of the information bits, wherein the determining of the LLRs comprises applying a machine learning, ML, model to a frequency domain representation of the received radio signal over a transmission time interval, TTI, the ML model being executable to process the frequency domain representation of the received radio signal and to output estimates of the LLRs based on results of the processing, and the ML model comprising at least:

a first frequency domain processing block;

at least one inverse fast Fourier transform, IFFT, block subsequent to the first frequency domain processing block;

a time domain processing block subsequent to the IFFT block; and at least one fast Fourier transform, FFT, block subsequent to the time domain processing block.

2. The radio receiver device according to claim 1, wherein the ML model further comprises a second frequency domain processing block subsequent to the FFT block.

3. The radio receiver device according to claim 2, wherein one or two of the first frequency domain processing block, the second frequency domain processing block or the time domain processing block are non-trainable.

4. The radio receiver device according to claim 2, wherein at least one of the first frequency domain processing block, the second frequency domain processing block or the time domain processing block comprises at least one residual neural network.

5. The radio receiver device according to claim 1, wherein the at least one IFFT block is configured to convert the received radio signal under the processing to time domain.

6. The radio receiver device according to claim 5, wherein the at least one FFT block is configured to convert the received radio signal under the processing to frequency domain.

7. The radio receiver device according to claim 6, wherein the first frequency domain processing block is configured to perform frequency domain based processing on the received radio signal under the processing, the second frequency domain processing block is configured to perform frequency domain based processing on the received radio signal under the processing, and the time domain processing block is configured to perform time domain based processing on the received radio signal under the processing.

8. The radio receiver device according to claim 1, wherein the first frequency domain processing block has multiple output channels, the amount of which being divisible by two.

9. The radio receiver device according to claim 2, wherein the received radio signal represents a single client device.

10. The radio receiver device according to claim 2, wherein the received radio signal represents multiple frequency-multiplexed client devices.

11. The radio receiver device according to claim 10, wherein the at least one IFFT block, the time domain processing block, the FFT block and the second frequency domain processing block are executed independently for each of the multiple frequency-multiplexed client devices.

12. The radio receiver device according to claim 11, wherein the independent execution is performed by executing the at least one IFFT block, the time domain processing block, the FFT block and the second frequency domain processing block on sub-bands allocated for each of the multiple frequency-multiplexed client devices.

13. The radio receiver device according to claim 1, wherein the ML model comprises more than one IFFT blocks and more than one FFT blocks executable for multiple channel pairs inside the ML model.

14. The radio receiver device according to claim 1, wherein the at least one memory and the computer program code are further configured to, with the at least one processor, cause the radio receiver device to perform training the ML model by applying a binary cross entropy loss function.

15. The radio receiver device according to claim 1, wherein the received radio signal comprises an orthogonal frequency-division multiplexing, OFDM, radio signal.

16. The radio receiver device according to claim 1, wherein the radio receiver device comprises a multiple-input and multiple-output, MIMO, capable radio receiver device.

17. A method comprising:

receiving, at a radio receiver device, a radio signal comprising information bits; and determining, by the radio receiver device, log-likelihood ratios, LLRs, of the information bits, wherein the determining of the LLRs comprises applying a machine learning, ML, model to a frequency domain representation of the received radio signal over a transmission time interval, TTI, the ML model being executable to process the frequency domain representation of the received radio signal and to output estimates of the LLRs based on results of the processing, and the ML model comprising at least:

a first frequency domain processing block;

at least one inverse fast Fourier transform, IFFT, block subsequent to the first frequency domain processing block;

a time domain processing block subsequent to the IFFT block; and at least one fast Fourier transform, FFT, block subsequent to the time domain processing block.

18. A non-transitory computer readable medium comprising instructions, when executed by an apparatus, configured to cause a radio receiver device to:

receive a radio signal comprising information bits; and determine log-likelihood ratios, LLRs, of the information bits, wherein the determining of the LLRs comprises applying a machine learning, ML, model to a frequency domain representation of the received radio signal over a transmission time interval, TTI, the ML model being executable to process the frequency domain representation of the received radio signal and to output estimates of the LLRs based on results of the processing, and the ML model comprising at least:

a first frequency domain processing block;

at least one inverse fast Fourier transform, IFFT, block subsequent to the first frequency domain processing block;

a time domain processing block subsequent to the IFFT block; and at least one fast Fourier transform, FFT, block subsequent to the time domain processing block.

19. The method according to claim 17, wherein the ML model further comprises a second frequency domain processing block subsequent to the FFT block.

20. The method according to claim 19, wherein one or two of the first frequency domain processing block, the second frequency domain processing blockor the time domain processing block are non-trainable.

* * * * *